(12) United States Patent
Baltes et al.

(10) Patent No.: US 10,678,954 B2
(45) Date of Patent: Jun. 9, 2020

(54) CYBERSECURITY VULNERABILITY PRIORITIZATION AND REMEDIATION

(71) Applicant: GM GLOBAL TECHNOLOGY OPERATIONS LLC, Detroit, MI (US)

(72) Inventors: Kevin M. Baltes, Wixom, MI (US); Karl B. Leboeuf, Lasalle (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 248 days.

(21) Appl. No.: 15/711,666

(22) Filed: Sep. 21, 2017

(65) Prior Publication Data
US 2020/0034574 A1    Jan. 30, 2020

(51) Int. Cl.
| G06F 11/00 | (2006.01) |
| G06F 21/78 | (2013.01) |
| G06F 21/60 | (2013.01) |
| G06F 12/14 | (2006.01) |

(52) U.S. Cl.
CPC ............ G06F 21/78 (2013.01); G06F 21/606 (2013.01)

(58) Field of Classification Search
CPC ........... G06F 21/577; G06F 2221/2145; H04L 63/1433
USPC ............................................. 725/25; 709/224
See application file for complete search history.

(56) References Cited

U.S. PATENT DOCUMENTS

| 8,438,643 | B2 * | 5/2013 | Wiemer | H04L 63/1433 380/250 |
| 9,401,926 | B1 * | 7/2016 | Dubow | H04L 63/1408 |
| 9,628,501 | B2 * | 4/2017 | Datta Ray | H04L 63/1433 |
| 9,747,570 | B1 * | 8/2017 | Vescio | H04L 63/1425 |
| 2008/0232595 | A1 * | 9/2008 | Pietrowicz | G06Q 20/3829 380/277 |
| 2009/0077666 | A1 * | 3/2009 | Chen | G06F 21/577 726/25 |
| 2014/0137257 | A1 * | 5/2014 | Martinez | H04L 63/1433 726/25 |
| 2015/0379443 | A1 * | 12/2015 | Whitney | G06Q 10/0637 705/7.28 |
| 2015/0381649 | A1 * | 12/2015 | Schultz | H04L 63/1433 726/25 |
| 2016/0197944 | A1 * | 7/2016 | Allouche | H04L 63/1416 726/23 |

(Continued)

*Primary Examiner* — Gary S Gracia
(74) *Attorney, Agent, or Firm* — Reising Ethington P.C.; David Willoughby (57) ABSTRACT

A system and method of evaluating one or more cybersecurity vulnerabilities to establish a priority metric for each of the one or more cybersecurity vulnerabilities, the method including: constructing a cybersecurity attack schema for each of the one or more cybersecurity vulnerabilities; determining, for each of the plurality of malicious actions of each of the one or more cybersecurity vulnerabilities, one or more resource metrics; obtaining, for each of the one or more cybersecurity vulnerabilities, one or more final resource metrics based on evaluating each of the one or more resource metrics; obtaining, for each of the one or more cybersecurity vulnerabilities, an impact metric that is indicative of a degree of damage that can be caused by the cybersecurity vulnerability; and calculating, for each of the one or more cybersecurity vulnerabilities, a cybersecurity priority level based on the impact metric and the one or more final resource metrics.

18 Claims, 5 Drawing Sheets

(56) References Cited

U.S. PATENT DOCUMENTS

| | | | |
|---|---|---|---|
| 2016/0248800 A1* | 8/2016 | Ng | H04L 63/20 |
| 2017/0032126 A1* | 2/2017 | Koike | G06F 9/4401 |
| 2017/0046519 A1* | 2/2017 | Cam | G06F 21/577 |
| 2017/0048266 A1* | 2/2017 | Hovor | H04L 63/1433 |
| 2017/0060559 A1* | 3/2017 | Ye | G06F 8/65 |
| 2017/0228658 A1* | 8/2017 | Lim | H04L 63/1425 |

* cited by examiner

CYBERSECURITY VULNERABILITY PRIORITIZATION AND REMEDIATION

INTRODUCTION

The present invention relates to prioritizing cybersecurity vulnerabilities and addressing the cybersecurity vulnerabilities according to their respective priority.

With the expansive universe of computers ever-growing, malicious actors have exposed and preyed upon various cybersecurity vulnerabilities that exist in various computing networks such as those utilized in vehicles. Some such cybersecurity vulnerabilities may prove more dangerous and create a risk of greater damage than other such cybersecurity vulnerabilities.

SUMMARY

According to a first aspect of the invention, there is provided a method of evaluating one or more cybersecurity vulnerabilities to establish a priority metric for each of the one or more cybersecurity vulnerabilities, the method including: constructing a cybersecurity attack schema for each of the one or more cybersecurity vulnerabilities, wherein the cybersecurity attack schema models various avenues of exposing the cybersecurity vulnerability, wherein the cybersecurity attack schema includes a plurality of malicious actions that can be performed, and wherein exposure of the cybersecurity vulnerability allows for potentially malicious damage to a targeted object; determining, for each of the plurality of malicious actions of each of the one or more cybersecurity vulnerabilities, one or more resource metrics; obtaining, for each of the one or more cybersecurity vulnerabilities, one or more final resource metrics based on evaluating each of the one or more resource metrics using a cybersecurity attack schema iteration process; obtaining, for each of the one or more cybersecurity vulnerabilities, an impact metric that is indicative of a degree of damage that can be caused by the cybersecurity vulnerability; and calculating, for each of the one or more cybersecurity vulnerabilities, a cybersecurity priority level based on the impact metric and the one or more final resource metrics.

In one or more particular embodiments, this method may include any one or more of the following features in any technically-feasible combination:

- the step of remedying at least one of the one or more cybersecurity vulnerabilities;
- the at least one cybersecurity vulnerability that is to be remedied is selected based on the cybersecurity priority levels of the one or more cybersecurity vulnerabilities;
- the remedying step includes obtaining a new software module or a new hardware component that is configured to address the at least one cybersecurity vulnerability and that is based on at least one of the plurality of associated malicious actions;
- the remedying step further includes installing the new software module or the new hardware component into the targeted object;
- the remedying step includes installing the new software module into the targeted object, and wherein the remedying step further includes uploading the software module over a land network and a cellular carrier system to the targeted object and, subsequently, carrying out the installing step;
- the targeted object is a vehicle and wherein the vehicle is configured to receive the software module at a telematics unit that is included in vehicle electronics of the vehicle, and wherein the vehicle electronics further include one or more vehicle system modules to which the software module is installed;
- the cellular carrier system includes a plurality of networking hardware components that are capable of transmitting and receiving radio transmissions according to one or more cellular communication protocols;
- the one or more resource metrics includes: a cost metric that represents an estimated or determined cost of carrying out the malicious action; a locality metric that is associated with a location from which the malicious action may be executed; a scalability metric that is associated with a degree to which the malicious action can be carried out on additional systems without new resources; and a skill metric that is associated with a level of skill that is required for a malicious attacker to carry out the malicious action;
- the obtaining the final resource metrics step includes obtaining a final cost metric, a final locality metric, a final scalability metric, and a final skill metric;
- the each of the final resource metrics is assigned a numerical value and wherein the calculating step further includes using the numerical values in the following formula to obtain the cybersecurity vulnerability priority level: $100 \times \tan h(C \times R_{impact} \times R_{cost} \times R_{locality} \times R_{scalability} \times R_{skill})$, wherein C represents a non-zero constant value, $R_{impact}$ represents the impact metric, $R_{cost}$ represents the final cost metric, $R_{locality}$ represents the final locality metric, $R_{scalability}$ represents the final scalability metric, and $R_{skill}$ represents the final skill metric;
- wherein the impact metric is based upon a safety impact indicator, a data sensitivity impact indicator, and a good will impact indicator; and/or
- wherein the impact metric is determined based on the following equation: Maximum of ($safety_{impact}$, $data\_sensitivity_{impact}$, $good\_will_{impact}$), wherein $R_{impact}$ represents the impact metric, $safety_{impact}$ represents the safety impact indicator, $data\_sensitivity_{impact}$ represents the data sensitivity impact indicator, and $good\_will_{impact}$ represents the good will impact indicator.

According to another aspect of the invention, there is provided a method of evaluating one or more cybersecurity vulnerabilities to establish a priority metric for each of the one or more cybersecurity vulnerabilities, the method including: constructing a cybersecurity attack schema for each of the one or more cybersecurity vulnerabilities, wherein the cybersecurity attack schema models various avenues of exposing the cybersecurity vulnerability, wherein the cybersecurity attack schema includes a plurality of malicious actions that can be performed, and wherein exposure of the cybersecurity vulnerability allows for potentially malicious damage to a targeted object; obtaining, for each of the one or more cybersecurity vulnerabilities, one or more final resource metrics based on evaluating each of the one or more resource metrics; obtaining, for each of the one or more cybersecurity vulnerabilities, an impact metric that is indicative of a degree of damage that can be caused by the cybersecurity vulnerability; calculating, for each of the one or more cybersecurity vulnerabilities, a cybersecurity priority level based on the impact metric and the one or more final resource metrics; and obtaining a new software module or a new hardware component that is configured to address the at least one cybersecurity vulnerability and that is based on at least one of the plurality of associated malicious actions.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and methods described below enable prioritization and remediation of cybersecurity vulnerabilities that may be present under particular computer systems. The present system and methods discussed herein can be used to protect one or more computer-based modules and/or electrical systems (i.e., targeted objects or systems) from theft, damage, or other malicious activity. The targeted object (i.e., the module or system that may have a cybersecurity vulnerability exposed) may have multiple cybersecurity vulnerabilities that can be exposed and/or utilized via one or more malicious actions by a malicious actor. According to at least some embodiments, the systems and methods herein enable prioritization of a targeted object's cybersecurity vulnerabilities and can provide for remedying such cybersecurity vulnerabilities according to their respective priority.

Figure 1:
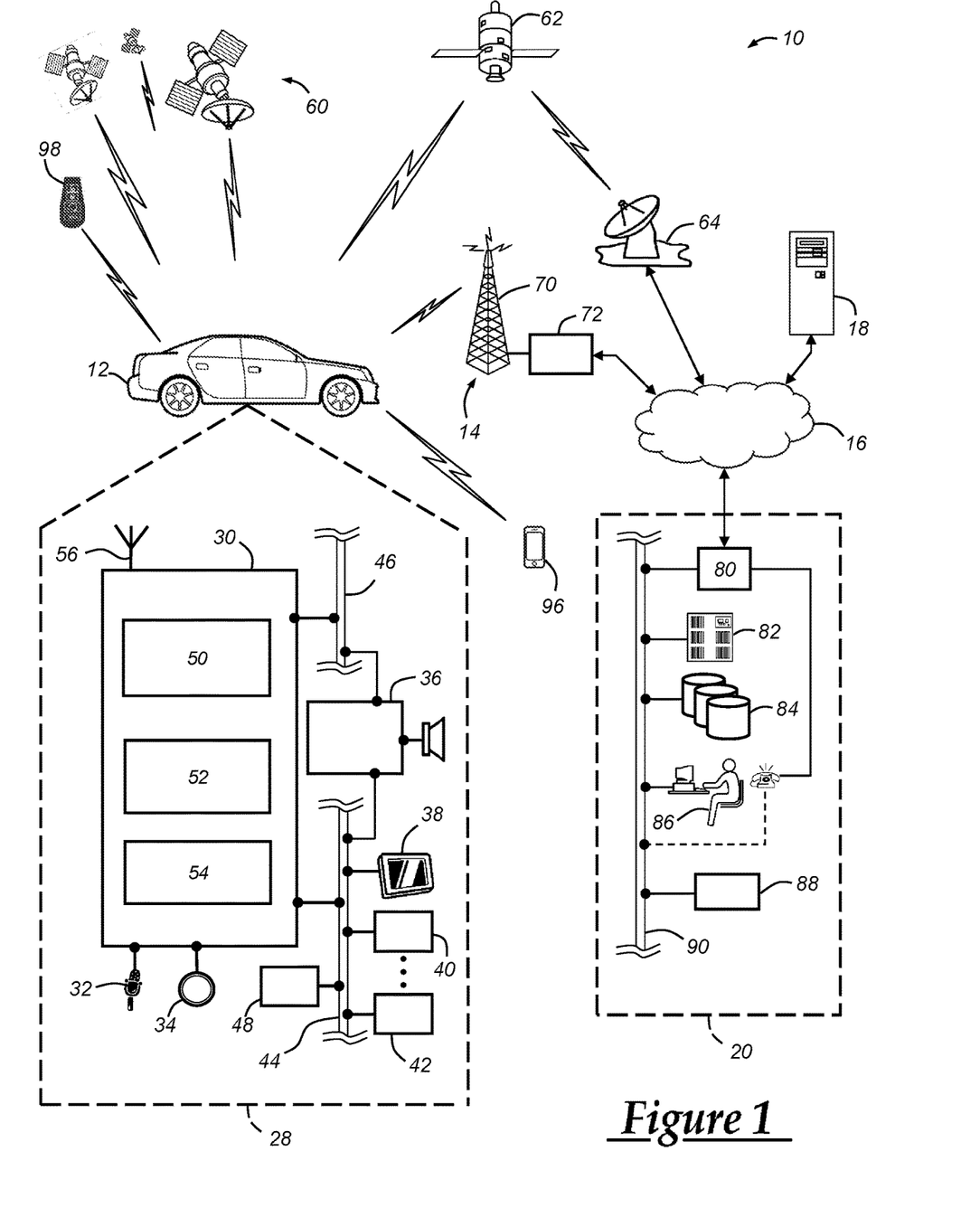
FIG. 1 is a block diagram depicting an embodiment of a communications system that can be used in conjunction with the method disclosed herein.

With reference to FIG. 1, there is shown an operating environment that comprises a vehicle communications system 10 and that can be used to implement at least some of the steps of one or more embodiments of the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed methods as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1 and includes a telematics unit 30, a microphone 32, one or more pushbuttons or other control inputs 34, an audio system 36, a visual display 38, and a global navigation satellite system (GNSS) module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GNSS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™ Wi-Fi direct, Bluetooth™ (including Bluetooth™ Low Energy (BLE)), or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GNSS-based vehicle navigation module 40; airbag deployment notification and other emergency or roadside assistance-related services that are provided in connection with one or more collision sensor interface modules such as a body control module (BCM) (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

Engine control unit (ECU) 48 may control various aspects of engine operation such as fuel ignition and ignition timing, as well as braking. ECU 48 is connected to communications bus 44 and may receive operation instructions from a body control module (BCM) (not shown) or other vehicle system modules, such as telematics unit 30 or VSMs 42. For example, the ECU 48 may receive a command from the BCM to start the vehicle—i.e., initiate the vehicle ignition or other primary propulsion system (e.g., a battery powered motor). In another scenario, the ECU 48 may receive a command from the BCM or telematics unit 30 to actuate one or more brakes of vehicle 12.

Global navigation satellite system (GNSS) module 40 receives radio signals from a constellation 60 of GNSS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GNSS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GNSS module 40 from the call center 20 via the telematics unit 30. Various types of satellite systems can be used, such as global positioning system (GPS).

Apart from the audio system 36 and GNSS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbutton(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions.

Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information, as well as information related to a plurality of cybersecurity vulnerabilities, such as cybersecurity vulnerability priority levels, cybersecurity vulnerability attack schemas, and resource metrics for various associated malicious actions. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Vehicle 12 can also communicate wirelessly, via short range wireless communication (SRWC) such as the IEEE 802.11 or Bluetooth™ protocols mentioned above, with mobile device 96 or passive entry technology keyfob or other key, referred to herein as a passive entry key (PEK) 98. PEK 98 may comprise a body that includes one or more switches or buttons for user interaction; further, the body may carry a processor, memory, and a wireless transmitter for the SRWC. As will be appreciated by those skilled in the art, the PEK memory may store and transmit a cryptographic key used for PEK validation at the vehicle. Some functions of the PEK 98 with the vehicle 12 may be passive (e.g., not requiring manual input by the user) such as enabling unlocking of the vehicle doors when the PEK is in the proximity of the vehicle, while other functions may require active input, such as a button press on the PEK 98 to, for example, unlatch a trunk of the vehicle. In any event, transmission of a wireless signal that includes the cryptographic key may initiate or control one or more of the vehicle functions such as locking and unlocking doors, starting the vehicle, operating a vehicle alarm system, operating a vehicle trunk release, etc.

The mobile device 96 may include: hardware, software, and/or firmware enabling cellular telecommunications and SRWC as well as other mobile device applications. The hardware of the mobile device 96 may comprise: a processor and memory (e.g., non-transitory computer readable medium configured to operate with the processor) for storing the software, firmware, etc. The mobile device processor and memory may enable various software applications, which may be preinstalled or installed by the user (or manufacturer) (e.g., having a software application or graphical user interface or GUI). One implementation of a vehicle-mobile device application may enable a vehicle user to communicate with the vehicle 12 and/or control various aspects or functions of the vehicle—e.g., among other things, allowing the user to remotely lock/unlock vehicle doors, turn the vehicle ignition on or off, check the vehicle tire pressures, fuel level, oil life, etc. In some embodiments, mobile device 96 may be able to act as a passive entry key, such as PEK 98 described above. In addition, the application may also allow the user to connect with the call center 20 or call center advisors at any time.

Figure 2:
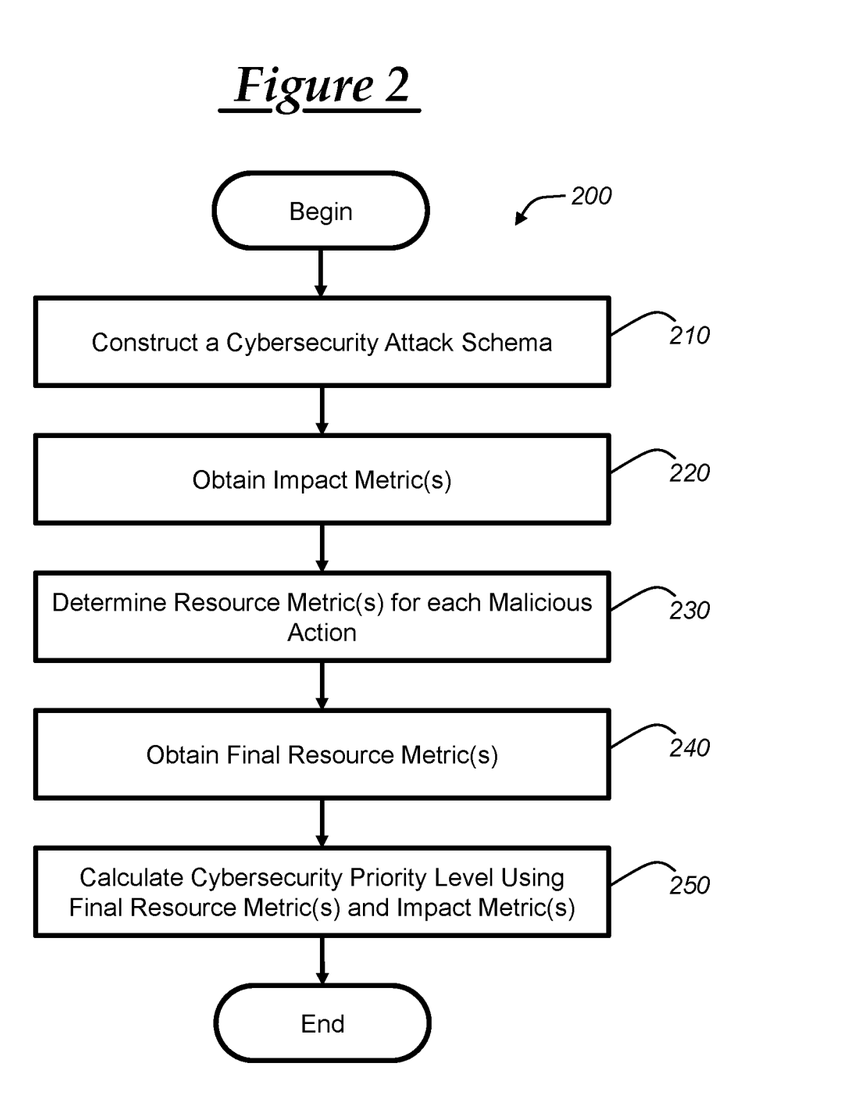
FIG. 2 is a flowchart illustrating a method of evaluating one or more cybersecurity vulnerabilities to establish a priority metric for each of the one or more cybersecurity vulnerabilities.

Turning now to FIG. 2, there is shown a method 200 of evaluating a cybersecurity vulnerability to establish a priority metric for the cybersecurity vulnerability. Method 200 can be used as a part of method 400 (FIG. 4), which is an embodiment of a method of evaluating one or more cybersecurity vulnerabilities to establish a priority metric for each of the one or more cybersecurity vulnerabilities.

Method 200 begins with step 210, where at a cybersecurity attack schema is constructed. The cybersecurity attack schema models various avenues of exposing the cybersecurity vulnerability and includes a plurality of malicious actions that can be performed. As used herein, a malicious action is any action or conduct that is or can be taken as a part of exposing or utilizing a cybersecurity vulnerability. In one embodiment, the cybersecurity attack schema can model various avenues of exposing the cybersecurity vulnerability through representing the various malicious actions and their interrelationships. According to many embodiments, exposure of a cybersecurity vulnerability allows for potentially malicious damage to the targeted object.

The cybersecurity attack schema may be constructed using various systems and/or modeling diagrams. For example, a computer 18 or server 82 can be used to develop the attack schema. The schema can be modeled using various software applications (e.g., Microsoft Word™, Microsoft PowerPoint™, Microsoft Visio™, AutoCAD™ or other CAD software) and may be generated automatically based on information stored at one or more databases 84. Or, the schema can be modeled manually through a user providing input into one or more software application(s) using computer 18 or server 82. In some embodiments, the cybersecurity attack schema construction step can include receiving user modeling input, wherein the user modeling input is input by a user that instructs a software application to construct a particular item of the schema, such as a malicious action or connector. Once the cybersecurity attack schema is constructed, the cybersecurity attack schema can be stored on a computer-readable memory, such as a non-transitory computer-readable memory.

Figure 6:
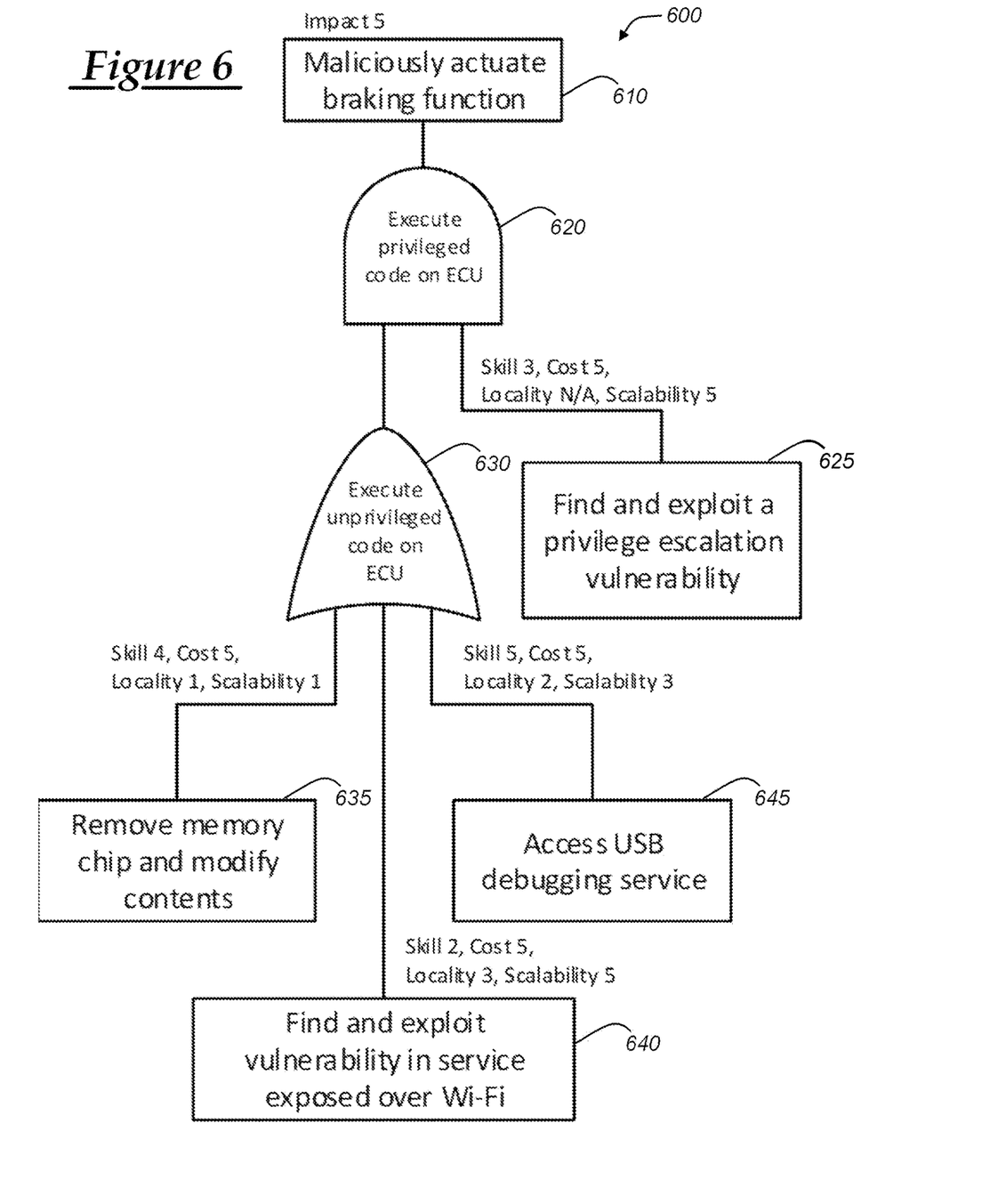
FIG. 6 is a block diagram illustrating one embodiment of a cybersecurity attack schema.

With reference to FIG. 6, there is shown an illustrative embodiment of a cybersecurity attack schema 600 that may be created for use in evaluating a cybersecurity vulnerability that may cause malicious actuation of a braking function of a vehicle. The cybersecurity vulnerability (e.g., malicious actuation of a braking function of a vehicle) of attack schema 600 is represented by block 610. Connectors 620 and 630 represent logical connectors that are used to represent relationships among the malicious actions 625, 635, 640, and 645.

Connector 630 is a logical "OR" connector (or gate) and is used to represent that at least one of its associated malicious actions 635, 640, or 645 needs to be carried out to expose the cybersecurity vulnerability. Connector 630 feeds into (i.e., as input) into connector 620, which is a logical "AND" connector (or gate) and that is used to represent that all of its associated malicious actions need to be carried out to expose the cybersecurity vulnerability. Thus, the attack schema illustration of FIG. 6 reads as requiring malicious action 625 along with one of malicious actions 635, 640, or 645 for the cybersecurity vulnerability 610 to be exposed. As will be explained more below, each of the malicious actions may include one or more associated resource metrics that can be used in conjunction with the cybersecurity attack schema to obtain one or more corresponding final resource metrics. These final resource metrics can then be used with an impact metric to obtain an overall cybersecurity priority metric, as will be explained in more detail below.

With reference back to FIG. 2, after a cybersecurity attack schema is constructed, the method 200 continues to step 220. In step 220, an impact metric is obtained for the cybersecurity vulnerability. As used herein, an impact metric is a metric that is indicative of or otherwise associated with a degree of damage that can be caused by the cybersecurity vulnerability. The impact metric can be obtained by computer 18 or a server 82 via user input or via recalling information from databases 84.

In one embodiment, the impact metric can be based on a safety indicator, a data sensitivity indicator, and/or a good will damage indicator. The safety indicator can represent a potential or likely impact to a customer or a user of the product or device to which the cybersecurity vulnerability relates. For example, in a case where the cybersecurity vulnerability relates to malicious actuation of a vehicle braking device (as illustrated in the example attack schema 600 of FIG. 6), a safety indicator may be set at 5 as a part of a 0 to 5 scale (with 0 indicating no impact to safety and 5 indicating severe impact to safety), indicating that a customer or user of a vehicle 12 that has its brakes maliciously actuated can be placed in severe danger. In one embodiment, the various potential safety indicator levels (e.g., 0 to 5) may be associated with an Automotive Safety Integrity Level (ASIL) (ISO 26262).

These indicators may be obtained by recalling certain data from a database 84, or by receiving input from a user at server 82 or computer 18. In one embodiment, one or more automated software or firmware tests may be run to obtain one or more indicators that can be used to obtain an impact metric. For example, vehicle module software/firmware tests may be carried out using one or more vehicle system modules 42 at vehicle 12. Or, in other embodiments, the VSM software/firmware can be tested using a virtual vehicle environment at server 82 and/or computer 18. Once these indicators are obtained, they may be combined and/or evaluated to obtain the impact metric. In one embodiment, the maximum value of the indicators can be used as the impact metric. For example, where a safety impact indicator, a data sensitivity impact indicator, and a good will impact indicator are used, the impact metric can be determined to be the maximum of these values—e.g., $R_{impact}$=maximum of (safety$_{impact}$, data_sensitivity$_{impact}$, good_will$_{impact}$), wherein $R_{impact}$ represents the impact metric, safety$_{impact}$ represents the safety impact indicator, data_sensitivity$_{impact}$ represents the data sensitivity impact indicator, and good_will$_{impact}$ represents the good will impact indicator. Thus, if the safety impact indicator is 4, the data sensitivity impact indicator is 2, and the good will impact indicator is 3, then the impact metric will be determined to be 4, since 4 is the maximum of ($safety_{impact}$, $data\_sensitivity_{impact}$, $good\_will_{impact}$). In other embodiments, more than one impact metric may be obtained. The method 200 continues to step 230.

Figure 3:
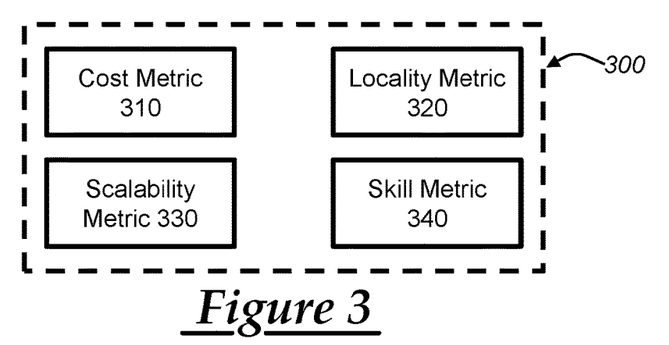
FIG. 3 is a block diagram illustrating various resource metrics that may be used in one or more embodiments of the method provided herein.

In step 230, at least one resource metric is determined for each of the plurality of malicious actions of the cybersecurity vulnerability. As used herein, a resource metric is a metric that is associated with a resource that is necessary for achieving the associated malicious action or that is associated with the availability or extensibility of the malicious action. With reference to FIG. 3, there is shown an embodiment 300 of four resource metrics 310-340: cost metric 310, locality metric 320, scalability metric 330, and skill metric 340.

The cost metric 310 can represent an estimated or determined cost of carrying out the malicious action. For example, the malicious action may require various computer hardware and/or software such that the malicious action may be carried out. The cost of such computer hardware and/or software may be used to determine the cost metric, which can be represented by, for example, assigning a particular cost metric value to a particular range of costs—for example: cost metric value "1" is associated with costs of more than $10 million; cost metric value "2" is associated with costs between $1 million to $10 million; cost metric value "3" is associated with costs between $100,000 to $1 million; cost metric value "4" is associated with costs between $10,000 to $100,000; and cost metric value "5" is associated with costs between $0 to $10,000.

The locality metric 320 can be associated with a location from which the malicious action may be executed. For example, the malicious action may require internal physical access to a particular hardware component of the system whose cybersecurity vulnerability is being exposed. Or, in other scenarios, it may be possible to carry out the malicious action using long-range wireless communications. Each of these various potential locations may be used in determining the locality metric, which can be sorted into a number of buckets that are associated with a location of which the malicious action may be carried out.

The scalability metric 330 can be associated with a degree to which the malicious action can be carried out on additional systems without new resources. For example, when physical access is required by a malicious action, the scalability metric may be low (e.g., a 1 on a scale of 1 to 5) thereby indicating that the entire malicious act must be carried out for each targeted object which is maliciously attacked (i.e., each targeted object whose cybersecurity vulnerability is sought to be exposed by the malicious actor). And, in other cases, a malicious act may be very scalable and, thus, may have a scalability metric that is high (e.g., a 5 on a scale of 1 to 5). An example of a highly scalable malicious action may be those that are carried out via use of a malicious computer program and where the malicious computer program need not be rewritten or modified to carry out subsequent malicious acts on other targeted objects.

The skill metric 340 can be associated with a level of skill that is required for a malicious attacker to carry out the malicious action. A malicious action may require no particular set of skills or information and, in such a case, a skill metric of a high value may be assigned or determined for the malicious action. Alternatively, the malicious action may require a very particular set of skills or certain confidential information and, in such a case, a skill metric of a low value may be assigned or determined for the malicious action. The method 200 continues to step 240.

In step 240, one or more final resource metrics are obtained. As mentioned above in step 230, a single or numerous resource metrics may be used and, also, each malicious action may have one or more associated resource metrics. A final value for each of the resource metrics may then be determined according to one or more methods or processes, one of which is provided in FIG. 5, which will be explained in more detail below. The final resource metrics are those resource metrics that are determined to be a final representation for a given cybersecurity vulnerability based on the individual resource metrics of the malicious actions that make up the given cybersecurity vulnerability. In one embodiment, a final cost metric, a final locality metric, a final scalability metric, and a final skill metric are obtained based on evaluating each of the cost metrics, locality metrics, scalability metrics, and skill metrics of the associated malicious actions. For example, with reference to FIG. 6, the resource metrics for each of the malicious actions 325, 335, 340, and 345 may be used to determine final resource metric(s) for the cybersecurity vulnerability 600 (or the malicious objective 610).

In some embodiments, a computer 18 or server 82 may be used to calculate or determine the final resource metrics. For example, a server 82 may query a database 84 for the resource metrics that are associated with each of the malicious actions that make up the cybersecurity vulnerability. Then, a processor of server 82 may execute computer instructions that determine the final resource metric(s) based on the recalled resource metrics. The final resource metric(s) may then be stored in memory, such as a non-transitory computer-readable memory. The method 200 continues to step 250.

In step 250, a cybersecurity priority level is calculated based on the impact metric and the final resource metric(s). For example, the cybersecurity priority level can be based on the final cost metric, the final locality metric, the final scalability metric, and the final skill metric. The cybersecurity priority level may be a value that represents a magnitude of the amount of damage is likely to occur and may be calculated with respect to other cybersecurity vulnerabilities.

In one embodiment, the score may be calculated based on a particular formula, such as: $100 \times \tan h(C \times R_{impact} \times R_{cost} \times R_{locality} \times R_{scalability} \times R_{skill})$, wherein C represents a constant, $R_{impact}$ represents the impact metric, $R_{cost}$ represents the final cost metric, $R_{locality}$ represents the final locality metric, $R_{scalability}$ represents the final scalability metric, and $R_{skill}$ represents the final skill metric. As used herein, "tan h" refers to the hyperbolic tangent function. The constant C may be a non-zero value and, according to a particular embodiment, may be any value greater than 0 and less than or equal to 0.01 ($0 < C \leq 0.01$). In other embodiments, various other formulas or methods can be used to calculate the cybersecurity priority level. In some embodiments, a processor of computer 18 or server 82 can calculate the cybersecurity priority level. As will be described in more detail below, once the cybersecurity priority level is determined for a given cybersecurity vulnerability, a determination may be made as to whether the cybersecurity vulnerability should be addressed. The method 400 of FIG. 4 described below details numerous embodiments of how this determination may be made. The method 200 then ends.

Figure 4:
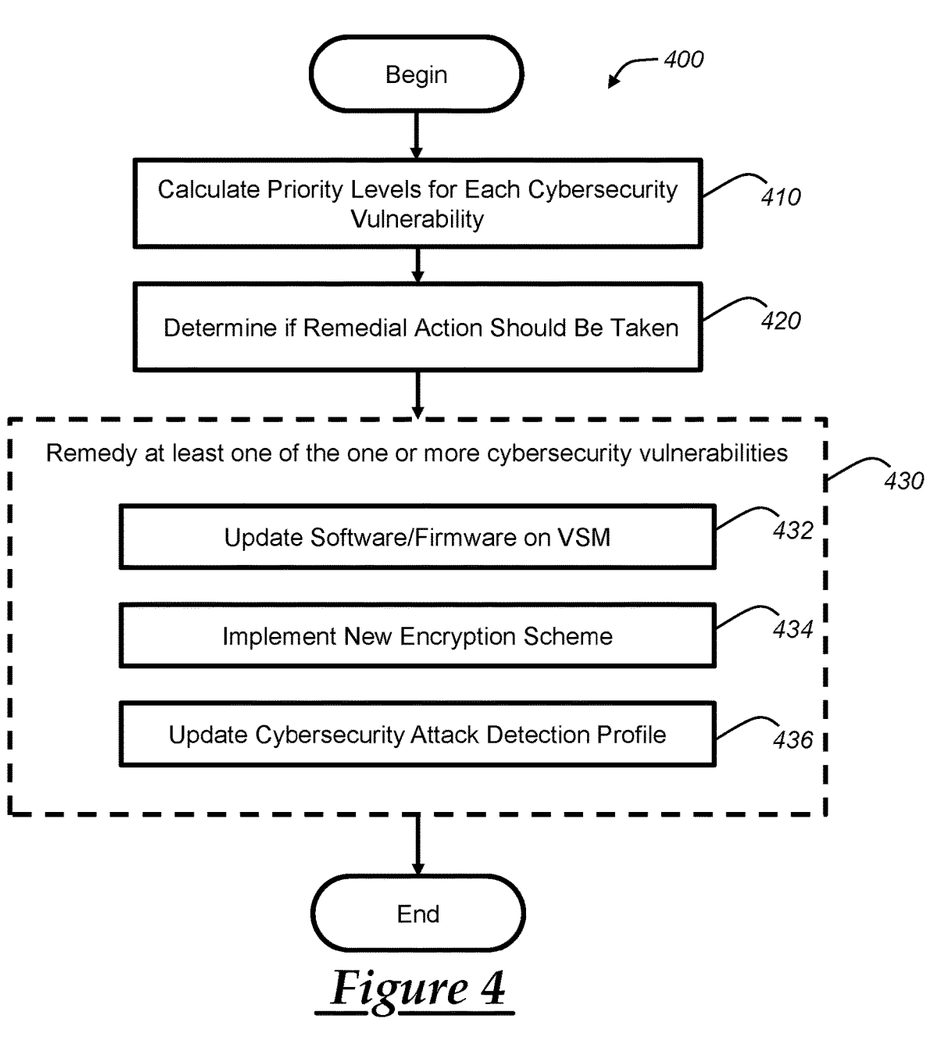
FIG. 4 is a flowchart illustrating a method of evaluating one or more cybersecurity vulnerabilities to establish a priority metric for each of the one or more cybersecurity vulnerabilities.

With reference to FIG. 4, there is shown an embodiment of a method 400 of evaluating one or more cybersecurity vulnerabilities to establish a priority metric for each of the one or more cybersecurity vulnerabilities. The method 400 begins with step 410 wherein cybersecurity priority levels are calculated for each of the one or more cybersecurity vulnerabilities. This step may be carried out according to method 200 described above. Once a cybersecurity priority level is calculated for each of the one or more cybersecurity vulnerabilities, the method 400 continues to step 420.

In step 420, a determination is made as to whether remedial action should be taken for a given one of the cybersecurity vulnerabilities. In one embodiment, it may be determined to carry out remedial action for those cybersecurity vulnerabilities whose cybersecurity priority level is at or exceeds a threshold cybersecurity level. This determination may be made by a processor at server 82 or computer 18. In other embodiments, each of the cybersecurity vulnerabilities may have their cybersecurity priority levels compared to the other cybersecurity vulnerabilities and, then, based on the levels, a determination may be made as to which order the cybersecurity vulnerabilities will be addressed (e.g., addressing the cybersecurity vulnerabilities with the highest cybersecurity priority level first).

In other embodiments, the cybersecurity priority levels of the cybersecurity vulnerabilities may be compared only to those that involve the same target object or system. For example, various priority levels for various cybersecurity vulnerabilities may be calculated for the ECU 48 and the telematics unit 30. Then, the priority levels of the cybersecurity vulnerabilities relating to the ECU 48 may be compared with one another to determine which of the ECU cybersecurity vulnerabilities should be addressed and, also, the priority levels of the cybersecurity vulnerabilities relating to the telematics unit 30 may be compared with one another to determine which of the telematics unit cybersecurity vulnerabilities should be addressed. The method 400 continues to step 430.

In step 430, at least one of the one or more cybersecurity vulnerabilities whose cybersecurity priority level is at or exceeded the threshold cybersecurity priority level is remedied. In some embodiments, this remedying step can include obtaining a new software module or a new hardware component that is configured to address the at least one cybersecurity vulnerability and/or that is based on at least one of the plurality of associated malicious actions. And, in a more particular embodiment, the remedying step can further include installing the new software module or the new hardware component into the targeted object. In other embodiments, remedial action is taken for each of the cybersecurity vulnerabilities for whom it was determined in step 420 to take action. The remedial action may be carried out in various ways and may be dependent upon the particular cybersecurity vulnerability, targeted object, and/or malicious actions of the cybersecurity vulnerability. The depicted embodiment of method 400 illustrates three potential remedial actions 432, 434, and 436 that may be taken to address a particular cybersecurity vulnerability.

Remedial action 432 can be taken where a software and/or firmware update may be used to fix the cybersecurity vulnerability, or at least to lessen the probability that it will be attacked and thus exposed. For example, this remedying step can include uploading the update (e.g., a software module) over land network 16 and a cellular carrier system 70 to the targeted object and, subsequently, installing the update to the vehicle. In one embodiment, the ECU 48 of the vehicle may be the targeted object and, thus, an over-the-air (OTA) update can be sent from computer 18 or server 82 to the vehicle via land network 16 and cellular carrier system 70. The OTA update can then be installed at ECU 48 by writing various computer instructions to memory, such as a memory device of ECU 48 or memory 54 of the telematics unit 30.

Remedial action 434 can be taken where a new encryption scheme can remedy the cybersecurity vulnerability. For example, where the cybersecurity vulnerability is due to an insecure encryption scheme, a new software or firmware application may be installed and/or implemented on the targeted object as to prevent and/or remedy exposure of the cybersecurity vulnerability.

Remedial action 436 can be taken in a scenario where the targeted object keeps a cybersecurity attack detection profile. As used herein, a cybersecurity attack detection profile is a set of characteristics, a set of events, and/or a set of behavior that has been recognized as being associated with a cybersecurity attack and/or malicious activity. The profile can be kept in memory device of the targeted system or object, such as memory 54 of telematics unit 30. The cybersecurity attack detection profile can be updated to prevent and/or mitigate damage caused by malicious actions. The method 400 then ends.

Figure 5:
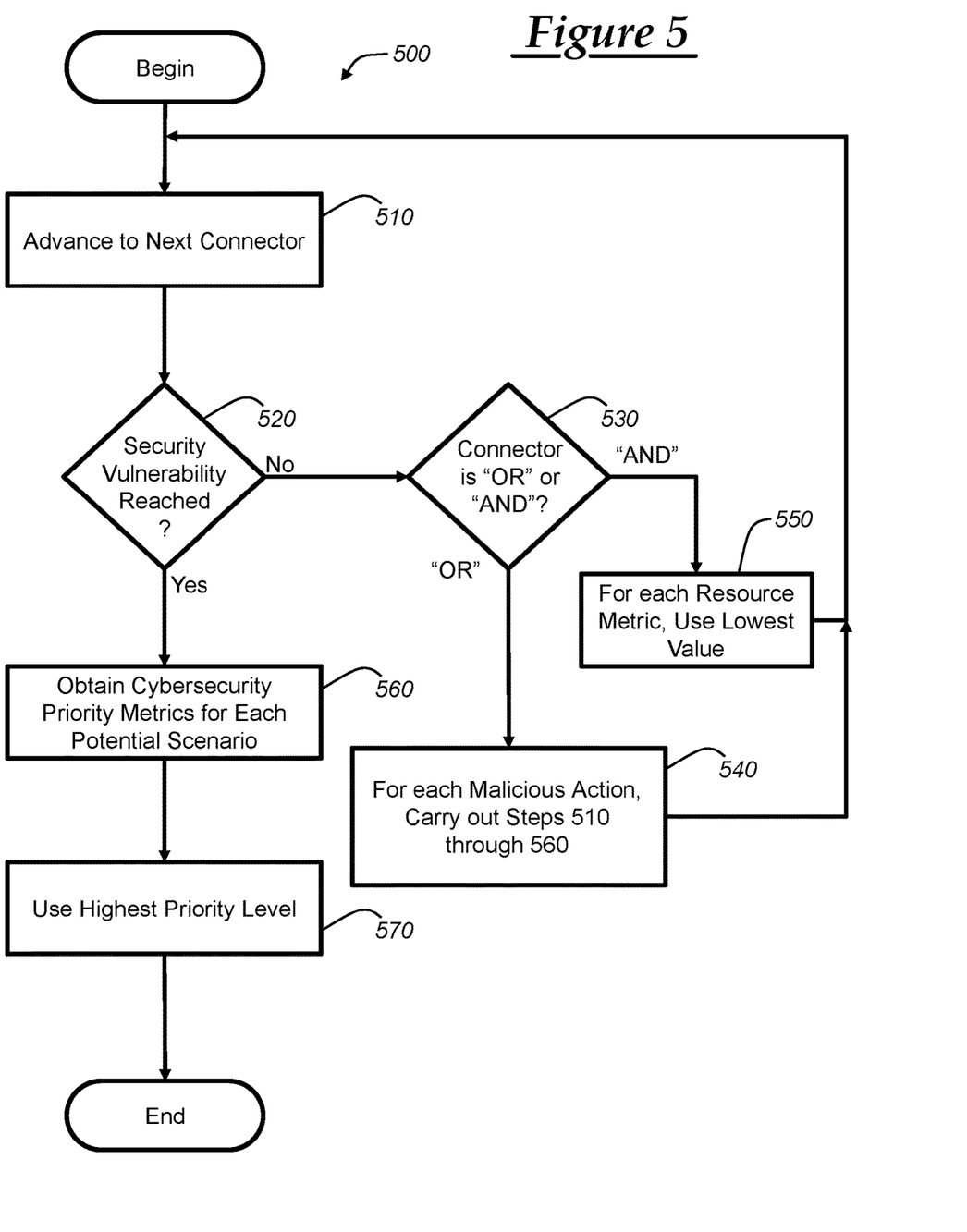
FIG. 5 is a flowchart illustrating a method of parsing through a cybersecurity attack schema to determine the highest priority level for a give cybersecurity vulnerability.

With reference to FIG. 5, there is shown a cybersecurity attack schema iteration process 500 that can be used by method 200 to carry out step 240 (FIG. 2). The method 500 is one example of how the cybersecurity attack schema iteration process can be carried out. As used herein, a cybersecurity attack schema iteration process is a process of evaluating each of the potential avenues of exposing the cybersecurity vulnerability using the one or more resource metrics for each of the malicious actions that are a part of the various potential avenues. The method 500 of FIG. 5 will be discussed with additional reference to the cybersecurity attack schema 600 shown in FIG. 6. This schema 600 is implemented as a set of starting conditions (e.g., cybersecurity risks/exploits) and a combination of logical relationships between those conditions.

The method 500 begins with step 510, wherein the method advances to the next connector of the schema 600. Initially, the method can begin with one of the connectors that are on the lowest hierarchical level of the cybersecurity attack schema, such as connector 630 of FIG. 6. As will be discussed more below, method steps 540 and 550 return to step 510 and, when such a scenario occurs, then the next connector for purposes of step 510 can be another connector at the same hierarchical level as the connector that was recently analyzed or, if no others are at the same level, then the next connector can be a connector in the next lowest hierarchical level. The method 500 continues to step 520.

In step 520, it is determined whether the cybersecurity vulnerability has been reached (i.e., there are no connectors left to analyze). If not, the method 500 continues to step 530; otherwise, the method 500 continues to step 560.

In step 530, it is determined whether the connector is a logical "OR" connector or a logical "AND" connector. The "OR" connector (such as connector 630 of FIG. 6) represents that only one of the malicious actions that is associated with it (such as malicious actions 635, 640, and 645) need to be carried out as part of a cybersecurity attack. The "AND" connector (such as connector 620 of FIG. 6) represents that all of the malicious actions that are associated with it (such as malicious action 625 and one of 635, 640, and 640) need to be carried out as part of a cybersecurity attack. If the connector is an "OR" connector, then the method 500 continues to step 540 and if the connector is an "AND" connector the method 500 continues to step 550. Other such operands may be used.

In step 540, the method can provisionally carry out steps 510 through 560 for each of the malicious actions that are associated with the connector. Once the method has been carried out for each of the potential malicious actions and, thus, a cybersecurity priority level is obtained for each of the various cases based on using the resource metrics of the selected malicious action in conjunction with the rest of the process. Then, in step 570, the highest cybersecurity priority level can be used. After step 540, the method continues to step 510.

In step 550, for each resource metric, the lowest value among all of the associated malicious actions or inputs (e.g., "OR" connector 630 is an input into the "AND" connector 620) is selected. Where an "OR" connector is input to the "AND" connector, then the process 500 is carried out and a cybersecurity priority level is calculated using each of the malicious actions associated with the "OR". The method 500 continues to step 510.

In step 560, cybersecurity priority metrics are obtained for each of the potential scenarios. For example, the cybersecurity attack schema 600 presents three potential scenarios since any one of the three malicious actions 635, 640, or 645 may be used. A cybersecurity priority level may be calculated for each of these three potential scenarios. The method 500 continues to step 570.

In step 570, the highest cybersecurity priority level is used. For example, where there are numerous potential scenarios as to how a cybersecurity vulnerability may be exposed, the highest cybersecurity priority level is used as the overall cybersecurity priority level for that cybersecurity vulnerability. The method 500 then ends.

FIG. 6 provides an example cybersecurity attack schema 600 that may be used for evaluating the cybersecurity vulnerabilities of a braking system. In one embodiment, the schema 600 can be used to represent a cybersecurity vulnerability relating to a vehicle braking function. In such an example, the goal of exposing the malicious action may be represented by the top block 610, which can be maliciously actuating a braking function, for example. The connector 620 can represent executing privileged code on an engine control unit (ECU) or other electronic control unit of the vehicle. Connector 630 can represent executing unprivileged code on the ECU. And, malicious action 625 can represent finding and exploiting a privilege escalation vulnerability (with a skill metric of 3, a cost metric of 5, no locality metric, and a scalability metric of 5), malicious action 635 can represent removing a memory chip and modifying its contents (with a skill metric of 4, a cost metric of 5, a locality metric of 1, and a scalability metric of 1), malicious action 640 can represent finding and exploiting vulnerabilities in service exposed over Wi-Fi™ (with a skill metric of 2, a cost metric of 5, a locality metric of 3, and a scalability metric of 5), and malicious action 645 can represent accessing a universal serial bus (USB) debugging service (with a skill metric of 5, a cost metric of 5, a locality metric of 2, and a scalability metric of 3). The overall impact metric of schema 600 can be, for example, 5.

Cybersecurity attack schema 600 includes malicious actions 625, 635, 640, and 645. As illustrated, malicious actions 635, 640, and 645 are connected via a logical "OR" connector, which represents that only one of the malicious actions 635, 640, and 645 must be carried out as to achieve the object of connector 630, which is to execute unprivileged code on an ECU. And, malicious action 625 and connector 630 are connected to one another via the logical "AND" connector 620. Thus, for the object of connector 620 to be achieved, the malicious action 625 (which is to find and exploit a privilege escalation vulnerability) must be carried out and the connector 630 must evaluate to true, which will be the case when any one or more of malicious actions 635, 640, and 645 are carried out. Upon connector 620 evaluating to true, then, the cybersecurity may be exposed, which can lead to a malicious action as represented in block 610—e.g., maliciously actuating a braking function of the vehicle. As discussed above with respect to FIG. 5, the schema 600 can be parsed to calculate an overall cybersecurity priority level or highest possible cybersecurity priority level (that is then used as the overall cybersecurity priority level).

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of evaluating one or more cybersecurity vulnerabilities to establish a priority metric for each of the one or more cybersecurity vulnerabilities, the method comprising:
    constructing a cybersecurity attack schema for each of the one or more cybersecurity vulnerabilities, wherein the cybersecurity attack schema models various avenues of exposing the cybersecurity vulnerability, wherein the cybersecurity attack schema includes a plurality of malicious actions that can be performed, and wherein exposure of the cybersecurity vulnerability allows for potentially malicious damage to a targeted object;
    determining, for each of the plurality of malicious actions of each of the one or more cybersecurity vulnerabilities, a plurality of resource metrics, wherein the plurality of resource metrics includes all of the following:
    a cost metric that represents an estimated or determined cost of carrying out the malicious action,
    a locality metric that is associated with a location from which the malicious action may be executed, and
    a scalability metric that is associated with a degree to which the malicious action can be carried out on additional systems without new resources;
    obtaining, for each of the one or more cybersecurity vulnerabilities, one or more final resource metrics based on evaluating each of the plurality of resource metrics using a cybersecurity attack schema iteration process;

obtaining, for each of the one or more cybersecurity vulnerabilities, an impact metric that is indicative of a degree of damage that can be caused by the cybersecurity vulnerability; and calculating, for each of the one or more cybersecurity vulnerabilities, a cybersecurity priority level based on the impact metric and the one or more final resource metrics, wherein the targeted object is a vehicle, wherein the impact metric is determined based at least partially on a safety indicator associated with a first one of the plurality of malicious actions of at least one of the cybersecurity vulnerabilities, and wherein the safety indicator is obtained at least partially based on information obtained as a result of an automated software or firmware test that is executed on at least one vehicle system module (VSM).

2. The method of claim 1, further comprising the step of remedying at least one of the one or more cybersecurity vulnerabilities.

3. The method of claim 2, wherein the targeted object is a vehicle that includes vehicle electronics having a plurality of vehicle system modules (VSMs), and wherein the step of remedying the at least one cybersecurity vulnerabilities includes updating a cybersecurity attack detection profile that is stored in memory of a first one of the plurality of VSMs of the vehicle.

4. The method of claim 3, wherein the targeted object is a vehicle, and wherein the cybersecurity vulnerability includes malicious actuation of braking function.

5. The method of claim 2, wherein the at least one cybersecurity vulnerability that is to be remedied is selected based on the cybersecurity priority levels of the one or more cybersecurity vulnerabilities.

6. The method of claim 5, wherein the remedying step includes obtaining a new software module or a new hardware component that is configured to address the at least one cybersecurity vulnerability and that is based on at least one of the plurality of associated malicious actions.

7. The method of claim 6, wherein the remedying step further includes installing the new software module or the new hardware component into the targeted object.

8. The method of claim 7, wherein the remedying step includes installing the new software module into the targeted object, and wherein the remedying step further includes at least partially uploading the software module over a cellular carrier system to the targeted object and, subsequently, carrying out the installing step.

9. The method of claim 8, wherein the cellular carrier system includes a plurality of networking hardware components that are capable of transmitting and receiving radio transmissions according to one or more cellular communication protocols.

10. The method of claim 7, wherein the remedying step includes installing the new software module into the targeted object, and wherein the remedying step further includes at least partially uploading the software module over a land network to the targeted object and, subsequently, carrying out the installing step.

11. The method of claim 10, wherein the targeted object is a vehicle and wherein the vehicle is configured to receive the software module at a telematics unit that is included in vehicle electronics of the vehicle, and wherein the vehicle electronics further include one or more vehicle system modules to which the software module is installed.

12. The method of claim 1, wherein the plurality of resource metrics further includes:

a skill metric that is associated with a level of skill that is required for a malicious attacker to carry out the malicious action.

13. The method of claim 12, wherein the final resource metrics include a final cost metric based on the cost metric, a final locality metric based on the locality metric, a final scalability metric based on the scalability metric, and a final skill metric based on the skill metric.

14. The method of claim 13, wherein the each of the final resource metrics is assigned a numerical value and wherein the calculating step further includes using the numerical values in the following formula to obtain the cybersecurity vulnerability priority level: $100 \times \tan h(C \times R_{impact} \times R_{cost} \times R_{locality} \times R_{scalability} \times R_{skill})$, wherein C represents a non-zero constant value, $R_{impact}$ represents the impact metric, $R_{cost}$ represents the final cost metric, $R_{locality}$ represents the final locality metric, $R_{scalability}$ represents the final scalability metric, and $R_{skill}$ represents the final skill metric.

15. The method of claim 1, wherein the impact metric is based upon a safety impact indicator, a data sensitivity impact indicator, and a good will impact indicator.

16. The method of claim 15, wherein the impact metric is determined based on the following equation:

$$R_{impact} = \text{Maximum of } (\text{safety}_{impact}, \text{data\_sensitivity}_{impact}, \text{good\_will}_{impact})$$

wherein $R_{impact}$ represents the impact metric, $\text{safety}_{impact}$ represents the safety impact indicator, $\text{data\_sensitivity}_{impact}$ represents the data sensitivity impact indicator, and $\text{good\_will}_{impact}$ represents the good will impact indicator.

17. A method of evaluating one or more cybersecurity vulnerabilities to establish a priority metric for each of the one or more cybersecurity vulnerabilities, the method comprising:

constructing a cybersecurity attack schema for each of the one or more cybersecurity vulnerabilities, wherein the cybersecurity attack schema models various avenues of exposing the cybersecurity vulnerability, wherein the cybersecurity attack schema includes a plurality of malicious actions that can be performed, and wherein exposure of the cybersecurity vulnerability allows for potentially malicious damage to a targeted object;

obtaining, for each of the one or more cybersecurity vulnerabilities, one or more final resource metrics based on evaluating each of a plurality of resource metrics, wherein the plurality of resource metrics includes all of the following:

a cost metric that represents an estimated or determined cost of carrying out the malicious action, a locality metric that is associated with a location from which the malicious action may be executed, and a scalability metric that is associated with a degree to which the malicious action can be carried out on additional systems without new resources;

obtaining, for each of the one or more cybersecurity vulnerabilities, an impact metric that is indicative of a degree of damage that can be caused by the cybersecurity vulnerability;

calculating, for each of the one or more cybersecurity vulnerabilities, a cybersecurity priority level based on the impact metric and the one or more final resource metrics; and obtaining a new software module that is configured to address the at least one cybersecurity vulnerability and that is based on at least one of the plurality of associated malicious actions, wherein the targeted object is a vehicle that includes vehicle electronics having a plurality of vehicle system modules (VSMs), wherein the cybersecurity vulnerability includes malicious actuation of braking function, wherein the step of obtaining a new software module includes transmitting the software module to the vehicle, and wherein the vehicle is configured to install the new software module in at least one of the plurality of VSMs in order to address the malicious actuation of the braking function.

18. A method of evaluating a plurality of cybersecurity vulnerabilities to establish a priority metric for each of the plurality of cybersecurity vulnerabilities, wherein the method is carried out by a vehicle system that includes a vehicle, the method comprising:

constructing a cybersecurity attack schema for each of the plurality of cybersecurity vulnerabilities of the vehicle system, wherein the cybersecurity attack schema models various avenues of exposing the cybersecurity vulnerability of the vehicle system, wherein the cybersecurity attack schema includes a plurality of malicious actions that can be performed to the vehicle system, wherein at least one of the malicious actions is capable of being carried out at the vehicle of the vehicle system, and wherein exposure of the cybersecurity vulnerability allows for potentially malicious damage to the vehicle of the vehicle system;

determining, for each of the plurality of malicious actions of each of the plurality of cybersecurity vulnerabilities, one or more resource metrics;

obtaining, for each of the plurality of cybersecurity vulnerabilities, one or more final resource metrics based on evaluating each of the one or more resource metrics using a cybersecurity attack schema iteration process;

obtaining, for each of the plurality of cybersecurity vulnerabilities, an impact metric that is indicative of a degree of damage that can be caused by the cybersecurity vulnerability; and calculating, for each of the plurality of cybersecurity vulnerabilities, a cybersecurity priority level based on the impact metric and the one or more final resource metrics, wherein the impact metric is determined based at least partially on a safety indicator associated with a first one of the plurality of malicious actions of at least one of the cybersecurity vulnerabilities, and wherein the safety indicator is obtained at least partially based on information obtained as a result of an automated software or firmware test that is executed on at least one vehicle system module (VSM).

* * * * *